Patent Number: 4,615,505
Date of Patent: Oct. 7, 1986

Anson et al.

[54] FLUID VALVE SYSTEM

[75] Inventors: Larry D. Anson, Columbia; Donald W. Miller, Baltimore, both of Md.

[73] Assignee: Environmental Elements Corp., Baltimore, Md.

[21] Appl. No.: 709,922

[22] Filed: Mar. 8, 1985

[51] Int. Cl.⁴ .................................... F16K 25/00
[52] U.S. Cl. .................... 251/174; 251/172; 251/328
[58] Field of Search ............ 251/174, 172, 329, 328

[56] References Cited

U.S. PATENT DOCUMENTS

| | | | |
|---|---|---|---|
| 2,732,170 | 1/1956 | Shand | 251/174 X |
| 3,077,332 | 2/1963 | Burtis | 251/174 X |
| 3,181,834 | 5/1965 | Jennings | 251/174 X |
| 3,504,883 | 4/1970 | Beck | 251/174 X |
| 3,698,429 | 10/1972 | Lowe | 251/174 X |
| 4,088,146 | 5/1978 | Hagar | 251/174 X |
| 4,176,673 | 12/1979 | Connor | 251/174 X |
| 4,325,411 | 4/1982 | Squirrell | 251/174 |
| 4,491,144 | 1/1985 | Dreyer | 251/174 X |

Primary Examiner—Harold W. Weakley
Attorney, Agent, or Firm—Morton J. Rosenberg

[57] ABSTRACT

A fluid valve system (10) is provided to control fluid flow passing from a conduit passage (12). The valve system (10) includes a movable closure (20) which is reversibly displaceable in a transverse direction (22) passing in a direction substantially normal to the fluid flow passing in a longitudinal direction (14). The movable closure (20) is insertable within the conduit passage (12) in order to block or cut off the fluid flow passing through aligned conduits (16 and 18). The valve system (10) includes a pair of resilient sealing mechanisms (34) which provide for substantially planar second sealing base members (46) for resiliently contacting opposing surfaces (48 and 50) of movable closure (20). Additionally, there is provided a biasing mechanism (56) for resiliently biasing the second sealing base members (46) into contiguous contact with surfaces (48 and 50) of movable closure (20) over an extended area. In this manner, there is provided an optimized leak minimization of the fluid passing within conduit passage (12) to the external environment.

13 Claims, 5 Drawing Figures

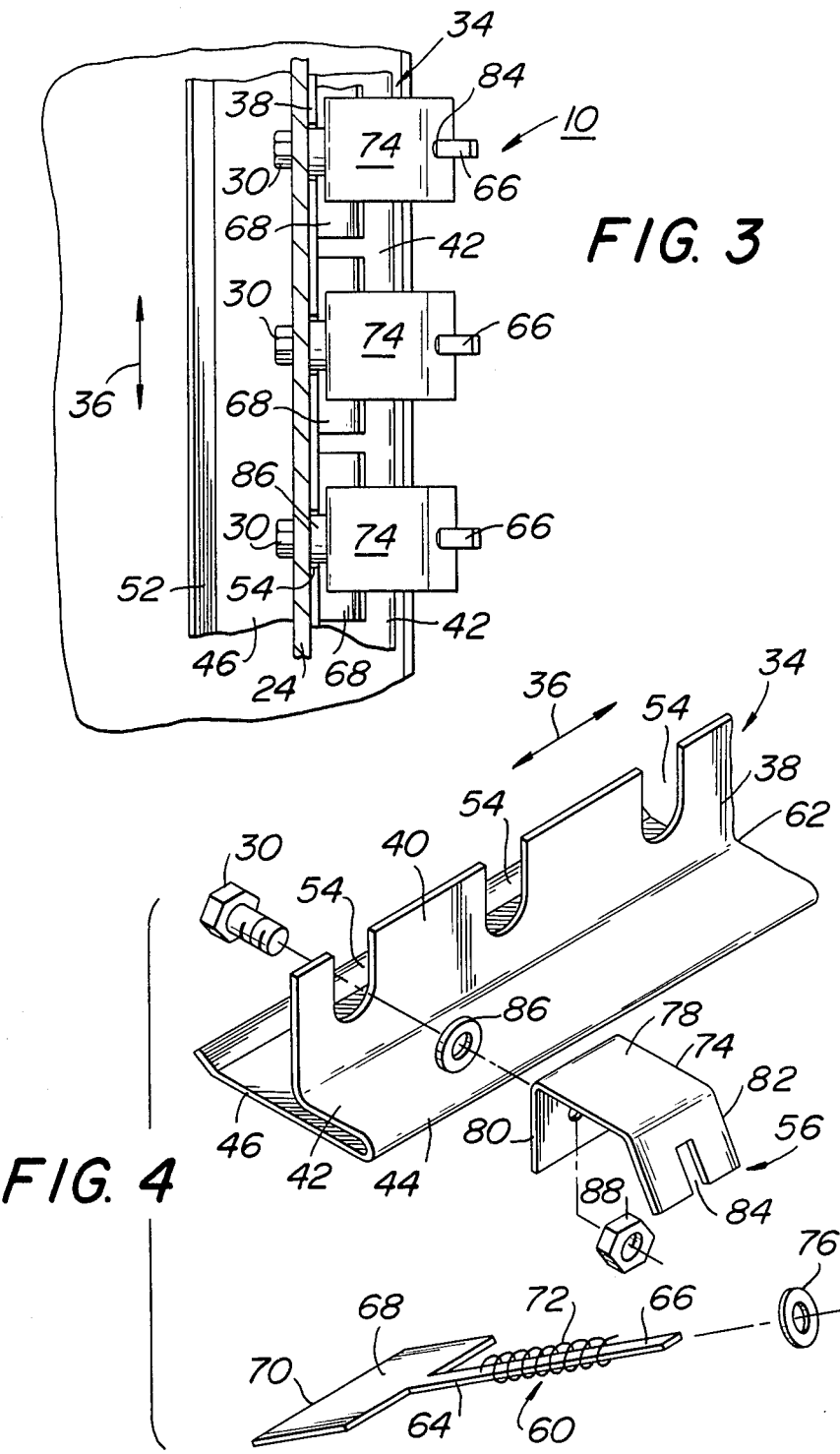

FLUID VALVE SYSTEM

BACKGROUND OF THE INVENTION

1. Field of the Invention

The subject invention pertains to fluid valve systems for controlling fluid flow through a conduit passage. In particular, the fluid valve system relates to closure seals for sealing openings provided in ducts through which slide gates are inserted for blocking fluid flow within the conduit passage. More in particular, this invention pertains to a fluid valve system that includes a pair of resilient sealing mechanisms having extended base members for contacting opposing surfaces of a flat plate member being inserted within the conduit passage for fluid cut-off purposes. Still further, this invention directs itself to a fluid valve system wherein the resilient sealing mechanisms are resiliently biased into contact with the flat plate member when such is being inserted into the conduit passages and are biased into contact each with respect to the other for sealing the opening in the ducts when the flat plate member is removed from contact. Still further, this invention relates to a fluid valve system which provides for a resilient biasing mechanism being in force loading contact with the resilient sealing mechanism to maintain the resilient sealing mechanism either in contact with opposing surfaces of the flat plate member or alternatively, in contact each with respect to the other over a substantial planar area to minimize leakage from the conduit passage.

2. Prior Art

Fluid valve systems utilized for cut-off of fluid flow through ducts is well-known in the prior art. Additionally, the use of slide gate enclosures into duct work where it is desired to control and regulate the flow of gases is also known in the prior art. The best prior art known to Applicant includes U.S. Pat. No. 3,789,879 which is hereby incorporated by reference, as well as U.S. Pat. Nos. 3,228,389; 2,582,877; 4,364,749; 3,035,810; 3,698,429; 3,504,883; 3,460,457; 3,951,130; and, 4,176,673.

In some prior art fluid valve systems, such as that shown in U.S. Pat. No. 4,176,673, there are provided pairs of flap type members which contact opposing surfaces of a flat plate gate member. However, such flap members are not contacted by a biasing mechanism which forces them into the closed position and increases the contact sealing area of the flap valves with respect to the flat plate member and with respect each to the other when the flat plate member is removed from the duct passage. In other prior art systems, such as that shown in U.S. Pat. No. 3,951,130, there are provided isolating dampers for closing a duct. However, such prior art systems depend on a closure member which is a generally lightweight low inertia body where the closure member may be moved between an open and a closed position by means of a rapidly acting operator. Such systems do not direct themselves to the constant resilient biasing mechanism concept which applies a load to the resilient sealing mechanism whether in contact on opposing surfaces with the flat plate member, or when in contact each with respect to the other.

In other prior art systems, such as that shown in U.S. Pat. No. 3,504,883, there are provided sealing mechanisms for dampers in which the seal is effected by a flexible loop of spring-tempered sheet material secured on opposing ends. The loop is elastically deformed in its cross-sectional shape by being pressed against a seating face to effect a seal between a displaceable member and a fixed frame. However, once again, such prior art systems do not direct themselves to the combination of a biasing mechanism to constantly force resilient sealing mechanisms into sealing contact with the movable plate member and itself when the movable plate member is removed from the duct.

In other prior art systems such as that shown in U.S. Pat. No. 3,698,429, there are provided cantilever seals for valves which include a cantilever leaf spring and a bias spring acting on the leaf spring to press the leaf spring against a seating surface when the seal is in a sealing position. However, such systems do not provide for a resilient sealing mechanism for contiguously interfacing with a movable closure such as a flat plate member throughout an extended surface area in combination with a biasing mechanism as provided in the subject invention concept.

REFERENCE TO RELATED PATENTS

U.S. Pat. No. 3,789,879 directed to a self-adjusting sealing apparatus assigned to the same Assignee Corporation as the subject invention is hereby incorporated by reference.

SUMMARY OF THE INVENTION

A fluid valve system for controlling fluid flow through a conduit passage. The fluid valve includes a movable closure which is reversibly displaceable internal the conduit passage for blocking fluid passing therethrough. A resilient sealing mechanism is coupled to at least one wall of the conduit for contiguously interfacing with the movable closure throughout an extended surface area thereof. Additionally, biasing means coupled to the conduit and the resilient sealing means are provided for biasing the resilient sealing mechanism into fluid sealing contact with the movable closure mechanism.

BRIEF DESCRIPTION OF THE DRAWINGS

FIG. 3 is a plane view of the fluid valve system;

FIG. 4 is an exploded perspective view of the resilient sealing mechanism; and,

DESCRIPTION OF THE PREFERRED EMBODIMENTS

Figure 1:
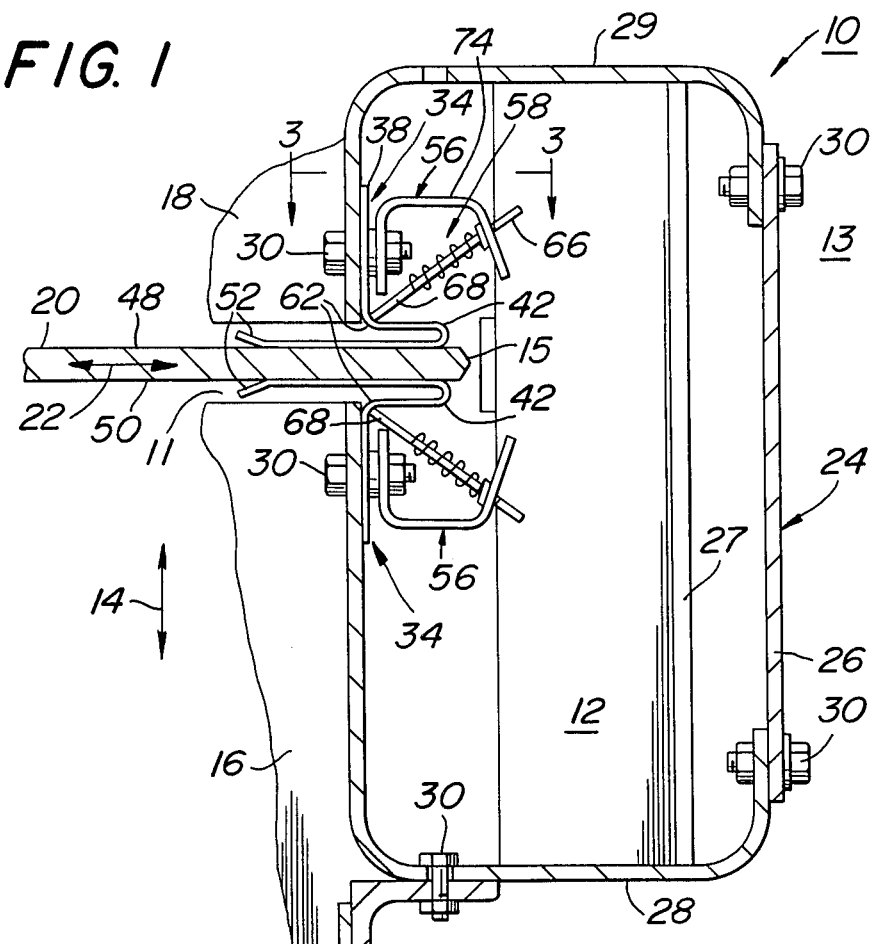
FIG. 1 is an elevational view of the fluid valve system.

Referring now to FIGS. 1-4, there is shown fluid valve system 10 commonly referred to as a slide gate valve seal system. In overall concept, fluid valve system 10 is provided for regulation, control and/or termination of flow from conduit passage 12 where fluid is flowing substantially in a direction substantially normal to longitudinal direction 14 in conduit 12, as is shown in FIG. 1. In the subject concept, regulation or termination of the flow of fluid within conduits 16 and 18 is provided by the insertion of movable closure 20 into the conduit passages. Movable closure 20 is reversibly displaceable through sapce or slot 11 formed between cooperating conduits 16 and 18.

Fluid passing through conduit passage 12 may have a pressure in excess of the pressure of external environment 13. Particularly, in such cases, there may be a considerable amount of fluid leakage through spacing or slot 11 from conduit passage 12 to external environment 13. In the event that there are noxious fluids or gases passing through conduits 16 and 18, escape of such gases to external environment 13 may be extremely deleterious in nature.

Figure 2:
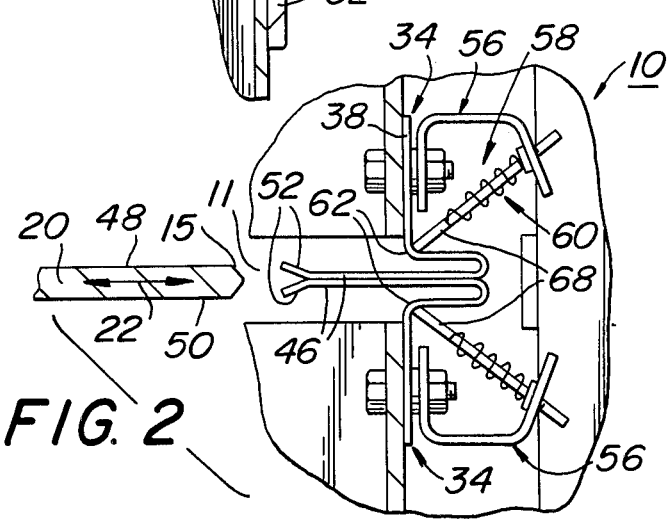
FIG. 2 is a partial cut-away elevational view of the fluid valve system with a movable closure removed from the conduit passageway.

In order to insure a minimization of leakage from conduit passage 12 to external environment 13, it is necessary to provide a valve sealing system which will provide high sealing capabilities when closure 20 is partially or fully inserted within conduit passage 12, as shown in FIG. 1, as well as to provide a high sealing capability when closure member 20 is completely removed from internal conduit passage 12, as is shown in FIG. 2.

It is to be understood that the term fluid as used herein may include both liquid and gaseous compositions. Further, fluid valve system 10 as described herein may operate between a pair of conduits 16 and 18 which are longitudinally and transversely aligned, each with respect to the other, to provide a through passageway in direction 14. Alternatively, conduits 16 and 18 may be a singular conduit which has therein mounted fluid valve system 10 for regulating and controlling the flow of fluid passing therethrough.

Fluid valve system 10 as herein described provides a mechanism whereby fluid passing through conduit passage 12 in longitudinal direction 14 may be controlled in an optimized and efficient manner. Of maximum importance, fluid valve system 10 provides a means whereby fluids passing within passage 12 are maintained internal to ducts 16 and 18 and are provided with an effective seal whether movable closure 20 is partially inserted, fully inserted, or fully retracted from conduit passage 12.

Fluid valve system 10 includes movable closure or flat plate member 20 displaceable in transverse direction 22 and/or ina direction substantially normal such as direction 36 shown in FIG. 3. As is seen in FIGS. 1 and 2, movable closure 20 is reversibly displaceable internal to conduit passage 12.

The manner and mode of the displacement of movable closure 20 in transverse direction 22 is not important to the inventive concept as herein described, and may be through one of a number of methods and systems known in the prior art. One system and method for displacing movable closure or flat plate member 20 is shown in U.S. Pat. No. 3,789,879, which has herein been incorporated by reference.

Movable closure or flat plate member 20 shown in FIGS. 1 and 2 includes upper and lower planar surfaces 48 and 50, respectively. Surfaces 48 and 50 are substantially planar in contour for interface with remaining elements of fluid valve system 10 as will be seen in following paragraphs. Closure 20 may be formed of a metallic composition such as steel, aluminum, or some like metal composition, not important to the inventive concept as herein described, with the exception that such have structural integrity responsive to the loads imposed thereon. Additionally, movable closure 20 may include frontal apex portion 15 which would aid in guiding movable closure 20 into contact with other elements of fluid valve system 10.

As has been stated, one of the most important concepts of fluid valve system 10 is that movable closure or flat plate member 20 may be completely removed from conduit passage 12, as shown in FIG. 2, while maintaining the interity of the sealing of conduits 16 and 18 to maintain the fluid or gaseous composition within conduit passage 12 with minimal leakage of such composition to external environment 13. Additionally, as will be seen in following paragraphs, fluid valve system 10 further provides for an extended sealing area between fluid valve system 10 and movable closure or flat plate member 20 in order to provide for high sealing efficiency when movable closure 20 is partially inserted within conduit passage 12.

Fluid valve system 10 as herein described may include access plate system or frame system 24 for mounting to the walls of ocnduits 16 and 18. However, it is to be understood that fluid valve system 10 is shown mounted to access plate system 24 for illustrative purposes only, and system 10 in general may be secured to the walls of conduits 16 and 18 without the necessity of the utilization of access plate system 24.

In the form shown in FIGS. 1-3, access plate system or frame system 24 may include first access plate member 26, frame members 28 and 29 coupled each to the other in fixed securement through strongback 27, as well as being coupled to conduits 16 and 18 through bolts 30 or some like technique, not important to the inventive concept as herein described. Access plate system 24 may be coupled to conduit 16 through L-shaped flange 32 by bolting or some like technique, such as welding. Access plate member system 24 formed of first and second access plate members 26, frame members 28, and 29 as well as strongback member 27, may be a metal composition not important to the inventive concept as herein described, with the exception that system 24 be able to accept the structural loads imposed thereon by the mounting thereto of the various elements of fluid valve system 10.

As shown in FIG. 1, movable closure 20 may be reversibly displaced in transverse direction 22. Thus, for purposes of illustration of this invention, the transverse dimension between second access plate member 28 and first access plate member 26 may define the transverse dimension of conduit passage 12. For purposes of explanation, as seen in FIG. 1, when movable closure 20 is fully inserted in conduit 12, flow from conduit passage 12 through slot 11 is substantially terminated. Thus, movable closure or flat plate member 20 is displaceable into conduit passage 12 substantially normal to a flow direction of fluid within duct system 16 and 18.

As illustrated in FIGS. 1 and 2, fluid valve system 10 includes a pair of cooperating resilient sealing mechanisms 34 mounted to access plate system 24 on opposing sides of movable closure 20 for interface with opposing surfaces 48 and 50. Additionally, as shown in FIG. 3, system 10 generally includes a plurality of resilient sealing mechanisms 34 mounted to conduits 16 and 18 or plate 24 in width direction 36. Since the mode of operation and the combination of elements forming each of sealing mechanisms 34 is substantially identical, the following paragraphs are directed to one resilient sealing mechanism description and mode of operation for purposes of succinctness and clarity.

Resilient sealing mechanism 34 is coupled directly or through frame 24 to at least one wall of conduits 16 and 18 for contiguously interfacing with movable closure 20 throughout an extended surface area of flat plate member 20 on surfaces 48 and 50. As is seen in FIGS. 3 and 4, resilient sealing mechanism 34 extends in direction 36 along conduit passage 12 and includes a plurality of capturing members 74 to be described in following paragraphs.

Resilient sealing mechanism 34 includes substantially L-shaped upper section 38 defining longitudinally extending sealing wall member 40 and transversely directed first sealing base member 42, when taken cross-sectionally with respect to direction 36. Resilient sealing mechanism 34 further includes lower section 44 defining second sealing base member 46 coupled to first sealing base member 42 and extending therebeneath in a direction substantially normal to longitudinally directed sealing wall member 40 when taken in cross-section with respect to width direction 36.

Second sealing base member 46 extends in transverse direction 22 and is substantially planar in contour throughout a large portion of its extension in direction 22. Second sealing base member 46 is configured to substantially contiguously interface with upper and lower surfaces 48 and 50 of movable closure 20, as is seen in FIG. 1.

As shown in FIG. 4, sealing wall member 40, first sealing base member 42 and second sealing base member 46 may be formed in one-piece formation. Additionally, resilient sealing mechanism 34 may be formed of a sheet metal composition, such as aluminum, or some like metallic composition, not important to the inventive concept as herein described, with the exception that such be able to provide some resiliency for insertion of movable closure 20 as well as being able to accomodate environmental conditions of the liquid or gaseous flow through conduit passage 12.

Second sealing base member 46 further includes upwardly inclined section or lip member 52 when taken with respect to the substantially planar surface of flat plate member 20. Thus, inclined sections 52 provide for a guide interface in cooperation with frontal apex portion 15 of movable closure 20 when movable closure 20 is being inserted between mating second sealing base members 46, as is shown in FIGS. 1 and 2. As shown in FIG. 2, lip members 52 of adjacently located second sealing base members 46 describes an opening within which apex 15 may be inserted and allows for some tolerance discrepancies which may occur.

Additionally, sealing wall member 40 as is seen in FIG. 4, includes a plurality of notches 54 displaced each from the other in width direction 36. Notches 54 provide a passage for coupling of bolt members 30 for securing resilient sealing mechanism 34 to the walls of conduits 16 and 18, or in the alternative, to access plate or frame system 24. Notches 54 are open-ended and allow for the sliding removal of sealing wall member 40 from bolt 30 without complete removal of bolt 30 from the overall system housing constraints. Additionally, the open-ended notches 54 allow for longitudinal placement of sealing wall member 40 in an optimized manner prior to bolting of sealing wall member 40 to the housing constraints. Notches 54 are utilizable to allow bolts 30 and washers 86 to prevent displacement of seal mechanisms 34 in direction 36.

Fluid valve system 10 further includes biasing mechanism 56 coupled to conduits 16 and 18, or frame system 24, as well as resilient sealing mechanism 34 for biasing resilient sealing mechanism 34 into fluid seal contact with upper and lower surfaces 48 and 50 respectively of movable closure 20. Biasing mechanism 56 includes forced loading mechanism 58 for applying a force loading to resilient sealing mechanism 34 in order to maintain second sealing base member 46 in contiguous contact and interface with at least one surface 48 or 50 of flat plate member 20.

Biasing mechanism 56 includes resilient forced loading mechanism 60 for applying a force load to resilient sealing mechanism 34. Resilient forced loading mechanism 60 as can be seen in FIGS. 1 and 2 applies a resilient force substantially at intersection 62 of sealing wall member 40 and first sealing base member 42.

Resilient forced loading mechanism 60 includes T-contoured forced loading member 64 defining stem member 66 and base member 68. Base member 68 contacts the inner surface of intersection 62 along base edge 70, as is shown in FIG. 4. Forced loading member 64 may be formed of a metallic composition such as steel, or some like composition, not important to the inventive concept as herein described, with the exception that such be structurally formed to accept the loads imparted thereon.

Coil spring member 72 is insertable on stem member 66 and is compressively secured between forced loading base member 68 and capturing member 74 for resiliently holding resilient force loading mechanism 60 in contact with intersection 62 of resilient sealing mechanism 34. As shown in FIG. 4, washer member 76 is insertable over stem member 66 of resilient force loading mechanism 60 to interface with coil spring member 72. In order to maintain contact therebetween, washer 76 includes an internal diameter greater than the width of stem 66 but less than the diameter of individual coils of coil spring 72 to provide a force bearing surface against which coil spring 72 may act.

Capturing member 74 captures resilient force loading mechanism 60 in substantially fixed positional location with respect to resilient sealing mechanism 34. Capturing member 74 defines a substantially U-shaped cross-sectional member having base portion 78 and a pair of leg members 80 and 82 secured thereto generally in one-piece formation.

As can be seen, capturing leg member 80 is substantially directed normal to the plane of capturing base member 78 while capturing leg member 82 is inclined with respect thereto. Capturing leg member 82 includes slot 84 having a width greater than stem section 66 of T-contoured force loading member 64 to allow extension of stem member 66 through slot 84, as is seen in FIGS. 1-4. Additionally, the width of slot 84 is less than the external diameter of washer member 76 to allow capturing of resilient force loading mechanism 60 with respect to an inner surface of inclined capturing leg member 82.

Slot 84 is open-ended to allow removal of stem 66 and thus removal of the entire force loading mechanism 60 from the constrained positional location shown in FIGS. 1 and 2.

Capturing member 74 is secured to frame members 28 and 29 by previously referred to bolts 30 and washer member 86 as well as nut 88 within notches 54 of sealing wall member 40 which allows sliding engagement therewith since the width of notches 54 are greater than the external diameter of washers 86. In this manner, capturing member 74 and resilient sealing mechanism 34 may be mounted to walls of conduits or ducts 16 and 18 in securement as previously described.

Thus, resilinet force loading mechanism 60 is captured between capturing member 74 and intersection 62 as is shown in FIGS. 1 and 2. Resilient force loading mechanism 60 is mounted between leg member 82 and intersection 62 and maintained in force loading condition by coil spring member 72.

When movable closure 20 is partially or fully inserted within conduit passage 12 as shown in FIG. 1, it is seen that T-contoured force loading member 64 maintains a force at intersection 62 however, coil spring 72 is compressively displaced. In this manner, second sealing base members 46 are maintained in forced contact in a contiguous manner with respect to surfaces 48 and 50.

Alternatively, when movable closure 20 is removed from contact with resilient sealing mechanism 34 as is shown in FIG. 2, resilient force loading mechanism 60 forces second sealing base members 46 into contiguous contact each with respect to the other through extension displacement of coil spring 72. Thus, even when movable closure 20 has been removed from resilient sealing mechanism 34, contiguous interface between opposing second sealing base members 46 provides for substantial sealing of spacing or slot 11 to maintain the fluids within conduit passage 12 to negate flow into duct members 16 and 18.

Figure 5:
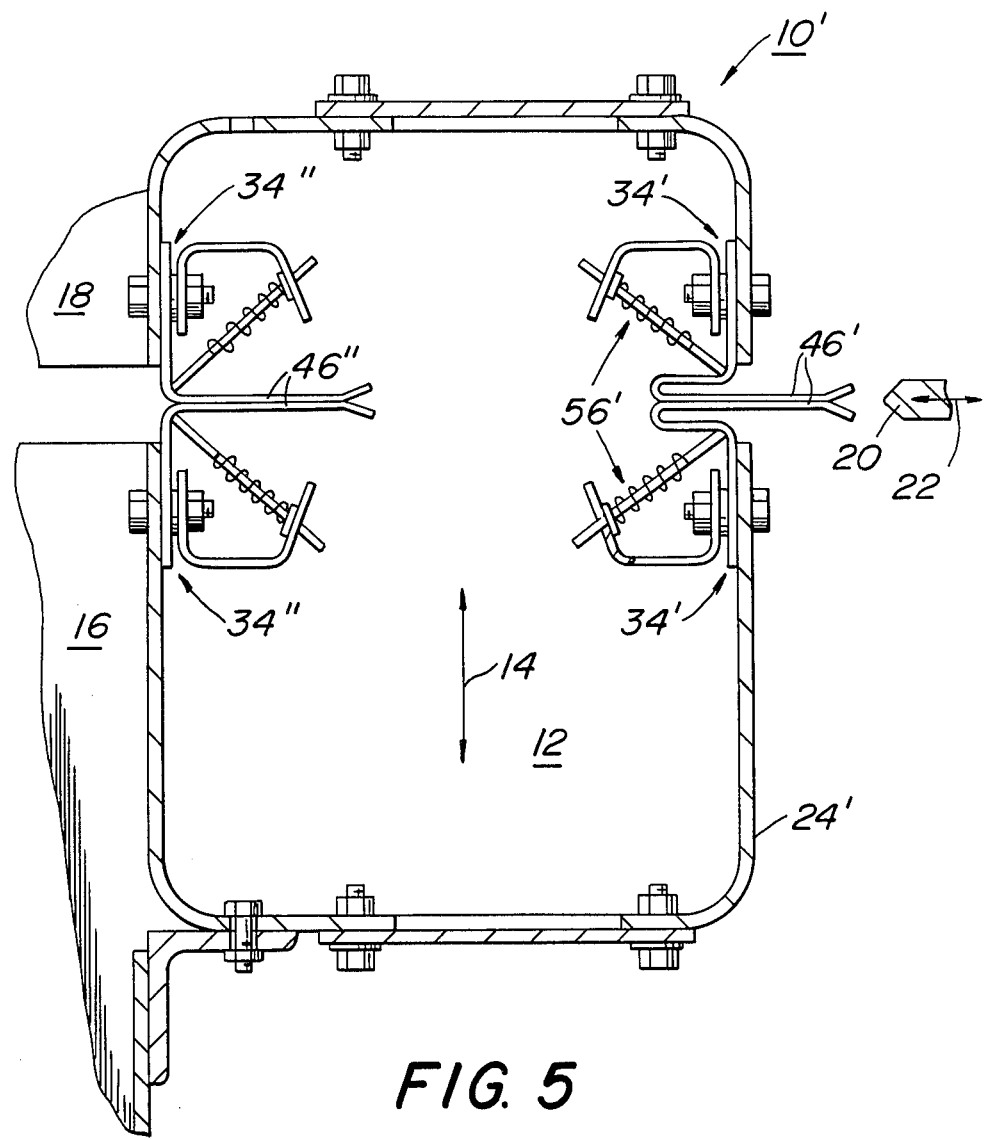
FIG. 5 is an elevational view of an embodiment of the fluid valve system.

Referring now to FIG. 5, there is shown fluid valve system 10' which is an embodiment of fluid valve system 10 previously described. Fluid valve system 10' substantialy incorporates the same overall concept and combination of elements previously described. Fluid valve system 10' as shown in FIG. 5 is utilized for controlling fluid flow from conduit passage 12. Flat plate member 20 as has been previously shown is displaceable in transverse direction 22. Flat plate member 20 is reversibly displaceable internal conduit passage 12.

Access plate or frame system 24' substantially defines the transverse dimensions of conduit passage 12 and may be coupled to or formed in one-piece formation with at least one wall of conduits 16 and 18.

As can be seen, a pair of opposing resilient sealing mechanisms 34' are secured through bolting or some like technique to frame system 24'. Second sealing base members 46' extend extenral fluid conduit passage 12 for receipt of flat plate member 20 therebetween. Biasing mechanisms 56' are provided for biasing resilient sealing mechanisms 34' into fluid sealing contact with flat plate member 20 on opposing planar surfaces thereof.

A pair of second resilient sealing mechanisms 34" are coupled to frame system 24' on an opposing transverse side when taken with respect to first pair of resilient sealing mechanisms 34'. First and second pairs of resilient mechanisms 34' and 34" are aligned each with respect to the other in longitudinal direction 14 for consecutively receiving flat plate member 20 when member 20 is inserted within conduit passage 12.

As can be seen, the pair of second resilient sealing mechanisms 34" include a pair of mating second sealing members 46" for receipt of movable closure or flat plate member 20. In this manner, movable closure or flat plate member 20 may be initially inserted between second sealing base members 46' and passed through to be received within second sealing base members 46". Thus, there is an additional sealing effect for fluid passing through conduit passage 12 for negating leakage of fluid within conduit passage 12 to external environment 13.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A fluid valve system for controlling fluid flow through a conduit passage, comprising:
   (a) movable closure means defining a substantially flat plate member having opposing surfaces being reversibly displaceably internal said conduit passage for blocking fluid passing therethrough;
   (b) resilient sealing means coupled to at least one wall of said conduit for contiguously interfacing with said moveable closure means throughout an extended surface area of said moveable closure means said resilient sealing means including a substantially L-shaped upper section defining a sealing wall member and a first sealing base member, and a lower section defining a second sealing base member coupled to said first sealing base member extending beneath said first sealing base member in a direction substantially normal said sealing wall member and through an opening formed in said wall of said conduit, said second sealing base member being substantially planar in contour for contiguous interfacing with a planar surface of said flat plate member of said movable closure means: and,
   (c) means coupled to said conduit and said resilient sealing means for biasing said resilient sealing means into fluid sealing contact with said moveable closure means; said means for biasing including resilient force loading means for applying a force load to said resilient sealing means, said resilient force loading means including a substantially T-contoured force loading member defining a stem member and a base member, said base member for contacting said resilient sealing means and a coil spring member insertable on said stem member, and means for capturing said resilient force loading means in substantially fixed positional location with respect to said resilient sealing means, said coil spring member compressively secured between said force loading base member and said means for capturing said resilient force loading means.

2. The fluid valve system as recited in claim 1 where said moveable sealing means is displaceable into said conduit passage substantially normal to a flow direction of said fluid within said conduit passage.

3. The fluid valve system as recited in claim 1 where said first sealing base member is formed in one piece formation with said second sealing base member.

4. The fluid valve system as recited in claim 1 where said second sealing base member includes an upwardly inclined section with respect to said planar surface of said flat plate member.

5. The fluid valve system as recited in claim 1 where said sealing wall member includes at least one notch formed therein for passage therethrough of a coupling bolt member for displaceably securing said resilient sealing means to said wall of said conduit.

6. The fluid valve system as recited in claim 1 where said resilient sealing means includes a pair of resilient sealing members coupled to at least one wall of said conduit, each of said resilient sealing members having a second sealing base member for contiguous interfacing contact with said moveable closure means on opposing surfaces thereof.

7. The fluid valve system as recited in claim 1 where said biasing means includes means for applying a force loading to said resilient sealing means for maintaining said second sealing base member in contiguous interface with one of said surfaces of said flat plate member.

8. The fluid valve system as recited in claim 1 where said resilient force loading means applies said force substantially at the intersection of said sealing wall member and said first sealing base member.

9. The fluid valve system as recited in claim 1 wherein said T-contoured force loading base member is in force contact with the intersection of said sealing wall member and said first sealing base member.

10. The fluid valve system as recited in claim 1 where said means for applying said force loading to said resilient means includes means for releaseably securing said resilient force loading means to said capturing means.

11. The fluid valve system as recited in claim 1 where said means for capturing said resilient force loading means includes a substantially U-shaped cross-sectional member having a base portion and a pair of leg members secured thereto.

12. The fluid valve system as recited in claim 11 where one of said leg members of said U-shaped cross-sectional member is inclined with respect to a plane formed by said base portion.

13. The fluid valve system as recited in claim 12 wherein said inclined leg member has a slot formed therethrough for insertion therethrough of said force loading means for releaseably securing said force loading means by said capturing means.

* * * * *